UNITED STATES PATENT OFFICE.

HENRY ORDENSTEIN, OF NEW YORK, N. Y.

MANUFACTURE OF ARTICLES FROM PLASTER-OF-PARIS OR OTHER COMPOSITIONS OR MATERIALS.

SPECIFICATION forming part of Letters Patent No. 370,645, dated September 27, 1887.

Application filed June 24, 1887. Serial No. 242,404. (No specimens.)

*To all whom it may concern:*

Be it known that I, HENRY ORDENSTEIN, of the city of New York, in the county of New York and State of New York, have invented a certain new and useful Improvement in the Manufacture of Articles from Plaster-of-Paris and other Porous Compositions or Materials, of which the following is a specification.

My invention is applicable to articles manufactured from plaster-of-paris and other porous or absorbent materials or compositions, (of which there are an indefinite number known in the arts,) the main ingredients of which are usually plaster-of-paris, clay, chalk, terra-alba, &c., or any earth, sometimes mixed with resinous or other substances, adapted to bind together the mass.

It has long been a desideratum to strengthen and harden manufactured articles of this character, and to give them a polishable surface. To this end a variety of substances have been employed, such as stearic acid, beeswax, oil, varnish, dextrine, solutions of mineral acids, &c. Stearic acid, beeswax, dextrine, mineral acids, oil, and varnish have been used in the form of baths, into which the manufactured articles have been immersed. Some of them, also, have been used as coingredients of the composition from which such articles are afterward formed, and some have been mixed with the water used in the manufacture of the articles. Each and all of them, however, are open to the objection either of not resisting the action of water and atmospheric humidity or of attracting and retaining dirt and dust.

I have discovered that the result aimed at can be attained without the attendant disadvantages above recited by the application and use of the product known commercially as "carnauba-wax," in the manner which I will now set forth, the method, in brief, consisting in first forming the article, and then treating it with carnauba-wax by immersing it for a longer or shorter time, as desired, in a bath of said wax.

The bath is prepared by melting the carnauba-wax, (which has a melting-point of 83°5′ Celsius.) The formed article to be treated with said wax is immersed in said bath, and is there allowed to remain for from, say, one to thirty minutes, according to the degree to which the article is to be impregnated or saturated with the wax. If the article be allowed to remain in the bath for one minute or so only, it will receive a coating of the wax without the latter penetrating into its interior to any great extent. The longer the article remains in the bath, the more it is penetrated and its pores are filled by the wax until, if the article be left in long enough, (and thirty minutes usually is a sufficient length of time,) the wax will permeate it entirely. After the article is taken out of the bath it will be found to have become hard and strong, and require no further treatment for that purpose. The wax penetrates the material of which the article is composed, closes all its pores, hardens and strengthens it, and gives it an exterior impervious to atmospheric and other influences. It will, however, in some cases be found advantageous to place the treated article in a well-heated room, so as to give any rough particles of the wax, which may have hardened or solidified on the surface of the article, an opportunity to again melt and to find their way to the interior of the article.

To polish the article a simple rubbing, after it has cooled, with a piece of clean linen or cloth or chamois-skin will suffice. A very high degree of polish can be attained by the use of a polishing-buffer.

By the foregoing treatment the article is strengthened and hardened. It is rendered polishable to a very high degree. It is also rendered weather and water proof, and can be washed and scrubbed without any injury even to its finest and most delicate parts. This is a result, which so far as I am informed, has not been attained before, inasmuch as all substances heretofore used to my knowledge for coating articles of the kind in question have had the disadvantage of being adhesive, not only attracting dust and dirt, but in some instances uniting with them, and thus making attempts at washing futile and useless.

The invention is of special value as applied to manufactured articles of plaster-of-paris, which as ordinarily made are fragile and easily damaged. The carnauba-wax imparts to them decided strength, and at the same time furnishes a water-proof surface, which lasts for a great length of time, and is susceptible of a very high degree of polish.

Having now described my improvement and the manner in which the same is or may be carried into effect, what I claim herein as new and of my own invention is—

1. The improvement in the manufacture of articles of plaster-of-paris and other porous composition or material, which consists in treating the formed article with carnauba-wax, substantially as and for the purposes hereinbefore set forth.

2. As a new manufacture, a formed article of plaster-of-paris or other porous composition having its cores filled with carnauba-wax, as set forth.

In testimony whereof I have hereunto set my hand this 21st day of June, A. D. 1887.

HENRY ORDENSTEIN.

Witnesses:
WILLIAM UNGER,
SUILBERT BOVERS,